United States Patent [19]

Popeil

[11] 3,933,315
[45] Jan. 20, 1976

[54] FOOD CHOPPER & CUTTING SURFACE

[75] Inventor: Samuel Joseph Popeil, Chicago, Ill.

[73] Assignee: Popeil Brothers, Inc., Chicago, Ill.

[22] Filed: July 12, 1974

[21] Appl. No.: 487,973

[52] U.S. Cl. .................. 241/166; 30/315; 241/169; 241/199.11; 241/272
[51] Int. Cl.² ......................................... B02C 18/04
[58] Field of Search .......... 241/100, 166, 168, 169, 241/199.9, 199.11, 272; 30/144, 315, 316

[56] References Cited
UNITED STATES PATENTS

| | | | |
|---|---|---|---|
| 1,610,322 | 12/1926 | Reich | 241/272 |
| 2,782,826 | 2/1957 | Zysset | 241/272 |
| 2,787,308 | 4/1957 | Popeil | 241/272 |
| 3,029,851 | 4/1962 | Zysset | 241/272 |
| 3,083,747 | 4/1963 | Zysset | 241/272 |

*Primary Examiner*—Granville Y. Custer, Jr.
*Assistant Examiner*—Howard N. Goldberg
*Attorney, Agent, or Firm*—Dominik, Knechtel, Godula & Demeur

[57] ABSTRACT

A food chopper is shown with a body having an upper and lower portion in which a convoluted blade is supported on a cross bar for purposes of chopping food stuffs contained in the lower housing and enclosed by a cutting surface secured beneath the lower housing. A cushioned type handle is provided atop the shaft which is connected to the blade, and a plunger shaft surrounds the main shaft and coacts with a plunger shaft guide interior of the upper housing to promote dimensional stability. The convoluted blade is secured to slots in the cross bar by means of pins which pass through and engage holes provided in the upper portion of the convoluted blade.

6 Claims, 14 Drawing Figures

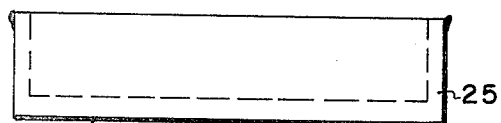
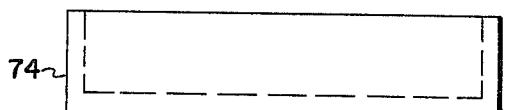
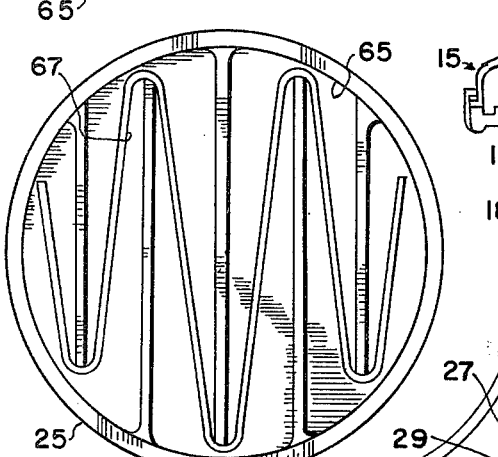
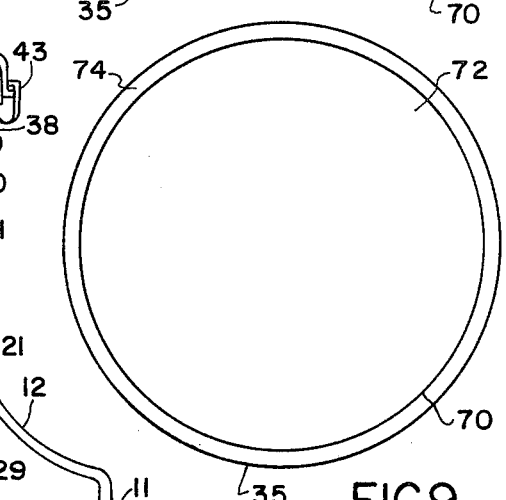
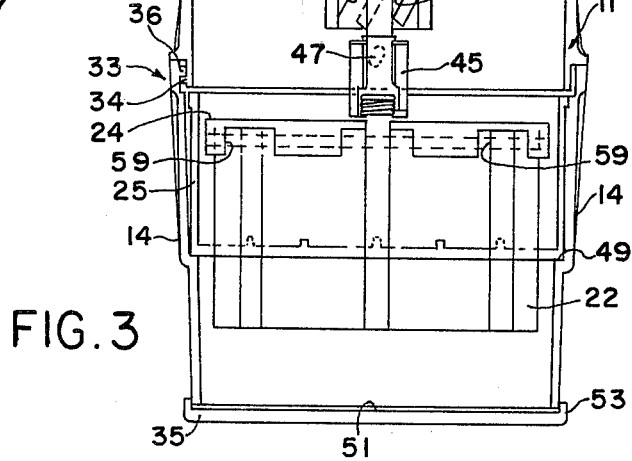
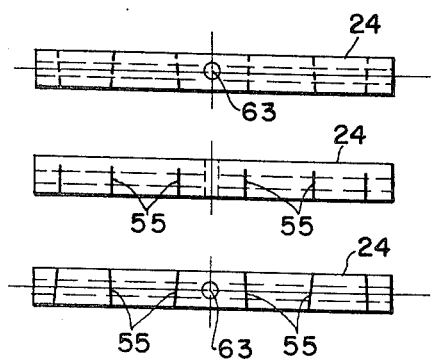
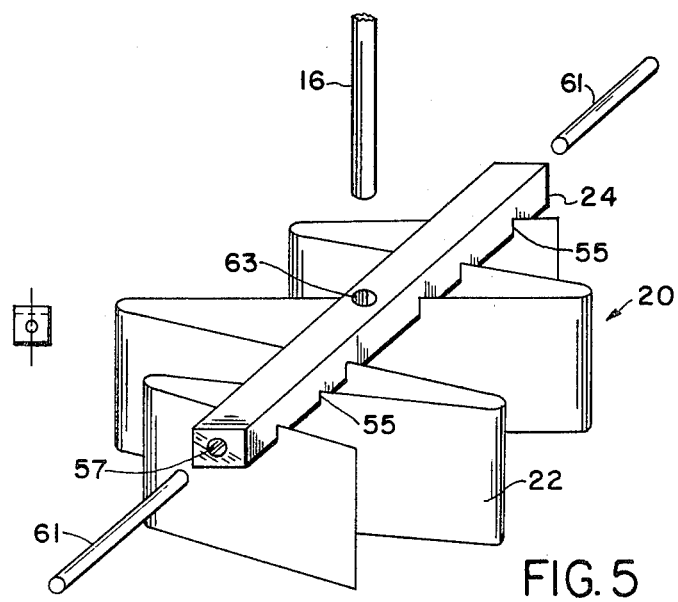

FOOD CHOPPER & CUTTING SURFACE

BACKGROUND OF THE INVENTION

1. Field of the Invention

The invention relates to the general art of hand-operated food choppers. More specifically, the invention relates to that type of food chopper having a convoluted blade which is reciprocated by hand action, and is usually used in the kitchen.

2. Description of the Prior Art

The prior art is best exemplified by the inventor's prior U.S. Pat. No. 2,787,308, now expired. As will be seen in U.S. Pat. No. 2,787,308, the chopper is intended for use on a cutting board or other flat surface, but is open at the bottom. In addition, to be noted, is the rather narrow support for the shaft as it penetrates the upper housing thus creating problems of alignment between the convoluted cutting blade and the stripper. Another prior art type of food chopper is exemplified in Carl Zysset U.S. Pat. No. 2,782,826. However, one of the difficulties inherent in this device is a possibility of friction attributable to food stuffs becoming wedged between portions of the convoluted blade, and thereby deflecting the same to bind against the slots in the stripper. Any dimensional instability, whether attributable to the bending of the blades, or deflection of the blades as a result of inadequate guidance of the shaft which reciprocates upwardly and downwardly, can result in binding and decrease the effectiveness of the unit and increase the amount of effort required for chopping. Furthermore, with food choppers of the type just described, after the food is chopped, there still remains the manual problem of directing the same into further food processing equipment, whether in a jar, glass, frying pan, salad or the like. No provision is made with the food choppers of the known art for this function.

Another drawback of the prior art food choppers relates to the handle element. It is apparent that the operator must apply a considerable amount of force to operate the chopper, and it has been found that this causes a significant amount of inconvenience and possible pain to the operator's palm.

SUMMARY

The present invention is directed to a food chopper and cutting surface in which the body has an upper and lower portion, and in the preferred embodiment, a securable cutting surface which is secured to the open area defined beneath the lower portion of the body. The convoluted blade is secured by means of pins to slots in a cross bar further to insure dimensional stability. This dimensional stability is further augmented by means of a separate plunger around the shaft which coacts with a plunger guide positioned in the upper portion of the upper housing. The upper housing is removably secured to the lower housing, the latter containing the stripper, to the end that after the chopping has been completed, the upper housing and convoluted blade can be withdrawn, the stripper removed and the contents of the chopped material are housed within the lower housing and the cutting surface which closes the lower portion of the lower housing for concenience in pouring or otherwise distributing for further preparation of the food stuffs.

In view of the foregoing, it is a primary object of the present invention to provide a food chopper with a cutting surface self-contained which permits the chopper to be used on formica tops, stainless steel drain boards having drain gutters, and even the top of a porcelain stove.

A related object of the present invention is to provide a food chopper and cutting surface in which the dimensional stability and orientation of the convoluted blade passing through the stripper is enhanced by the use of a plunger and plunger guide, respectively, on the shaft and the upper portion of the housing.

A further object of the invention is to provide a food chopper of the type described wherein the handle is provided with a cushion to soften the impact with the operator's palm when in use.

DETAILED DESCRIPTION OF DRAWINGS

Further features of the invention pertain to the particular arrangement of the elements and parts whereby the above-outlined and additional operational features thereof are attained.

The invention, both as to its organization and method of operation, together with further objects and advantages thereof will best be understood by reference to the following specification, taken in connection with the accompanying drawings in which:

FIG. 3 is a side elevational view, in cross-section showing the details of the improved food chopper of the present invention with the shaft and attached blade assembly in a partially lowered position;

FIG. 4 is a combined figure showing top and bottom views of the cross-bar as well as a side elevational cross-sectional view therof which relates to the positioning of the blades therein;

FIG. 5 is a perspective exploded view showing the interconnection of the convoluted blades with respect to the cross bar and the means by which the cross bar is pinned to the blades, and the shaft pinned to the cross bar;

FIG. 6 is a side elevational view of the stripper which nests within the upper end of the lower portion of the body;

FIG. 7 is a bottom view of the stripper showing the convoluted slots through which the blade penetrates;

FIG. 8 is a side elevational view of the cutter board which mates with and engages with the lower end of the lower portion of the body;

FIG. 9 is a top view of the cutting board showing the cutting surface and the peripheral rim thereof;

Figure 1:
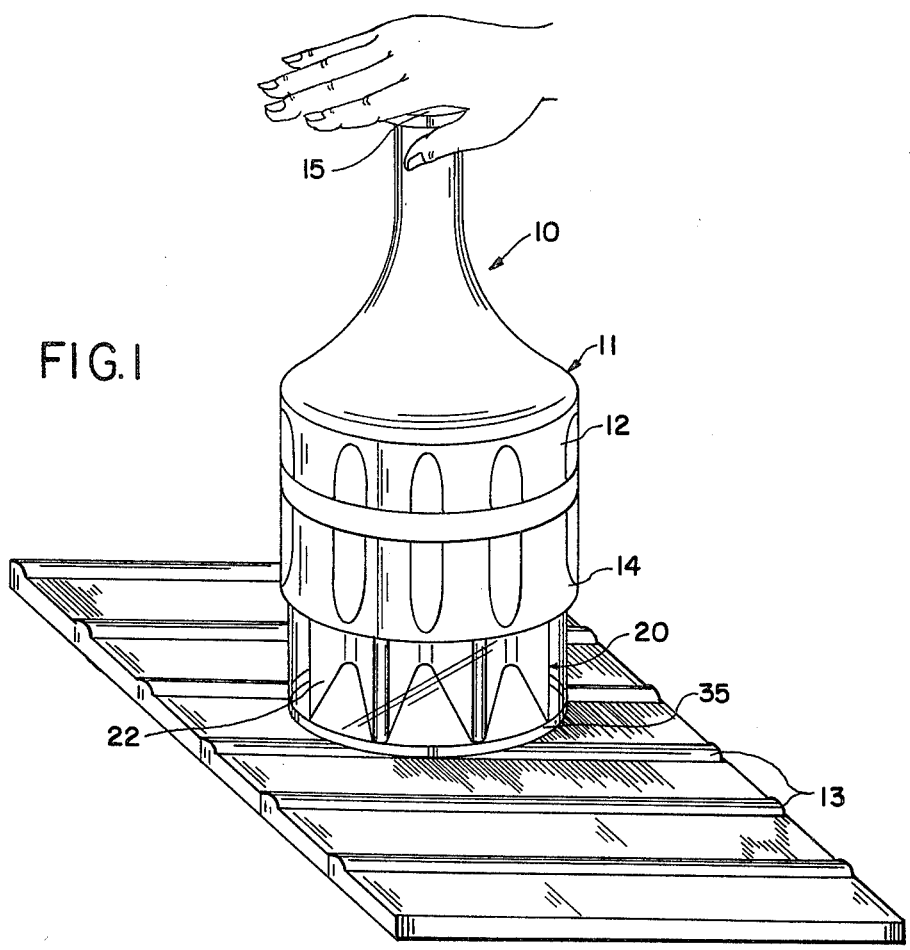
FIG. 1 is a perspective view showing the food chopper of the present invention as positioned atop a corrugated surface.
Figure 2:
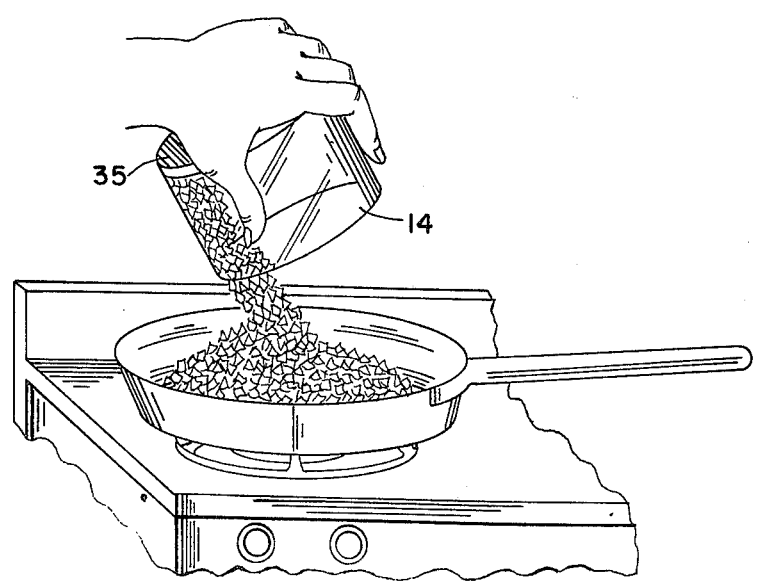
FIG. 2 is a perspective view showing the manner in which the lower portion of the body of the subject food chopper may be used as a container for further processing food stuffs chopped therein.

With reference to FIGS. 1 and 2 of the drawings, the functional use of the subject improved food chopper, generally referred to by the numeral 10 is illustrated. For example, in FIG. 1 of the drawings, it is illustrated how the subject food chopper 10 may be utilized upon an underlying surface which is corrugated or convoluted such as illustrated at 13. It is considered to be one of the features of the present invention that the food chopper of the subject invention may be utilized even on a corrugated surface, whereas food choppers of the type exemplified in the prior art necessarily require utilization on a flat surface. Hence, FIG. 1 clearly illustrates one improved feature of the present invention.

With respect to the food chopper 10, it will be observed that the same consists of a body 11 formed by an upper housing 12 and a lower housing 14. The upper housing 12 and lower housing 14 are interconnected by means of a bayonet-type locking arrangement as will be more fully described hereinafter. The upper portion of the upper housing 11 carries a handle 15 which actuates the blade assembly 20 in the same manner as heretofore known in the art. The lower end of the lower housing 14 is closed off by means of a cutting board 35 which frictionally engages the lower end of the lower housing 14, as will be more fully described hereinafter.

With regard to FIG. 2 of the drawings, the manner in which the lower housing 14 and the cutting board 35 function as a container for the chopped food stuffs for further food preparation is illustrated. It is apparent that once the food stuffs have been thoroughly chopped, that the operator need only remove the upper housing 12 by disengaging the bayonet-type locking assembly, and further removing the blade assembly 20 and the stripper 25 such that there remains a container formed by the lower housing 14 and cutting board 35. This assembly forms a convenient container for transporting the chopped food stuffs to a skillet or other utensil being employed in the further preparation of the food stuffs.

With specific reference to FIG. 3 of the drawings, the detailed construction of the subject food chopper 10 is illustrated. The upper housing 12 is provided with a plunger guide 31 formed integrally with the upper portion thereof and is of sufficient internal diameter to permit the reciprocating movement of the plunger 30 therein during the chopping operation. The lower end of the plunger guide 31 is provided with a clutch assembly 21 which is formed by a clutch housing 27 fixedly secured to the plunger guide 31. The lower portion of the clutch housing 27 is provided with a plurality of circumferentially arranged guide slots 29 which are all slanted from the vertical axis. The lower end of the upper housing 12 is provided with bayonet fastening means generally referred to by the numeral 33, formed by a plurality of lock flanges 34 circumferentially arranged around the lower end of the upper housing 12 which bayonet fasten with bayonet flanges 36 circumferentially arranged around the upper portion of the lower housing 14. It is thus apparent that the upper and lower housings 12 and 14 respectively may be easily engaged and disengaged by simply turning the respective housings 12 and 14 in opposite directions with respect to one another.

It will further be observed that the handle 15 formed by lower support bar 38 which is coextensive with the plunger 30 is reciprocally movable within the plunger guide 31 adjacent to the top portion of the upper housing 12. It will further be noted that the plunger 30 is provided with an internal shoulder 39 such that a coil spring 18 is positioned between the internal shoulder 39 and the upper end of the clutch housing 27. The shaft 16 forming part of the handle 15 is frictionally engaged within the restricted diameter of the plunger 30 at its upper end and extends downwardly through the plunger 30, and through the clutch housing 27 and is fixedly secured to the cross bar 24 in a manner which will be more fully described in connection with FIG. 5 of the drawings. It is also to be noted that another preferred feature of the present invention is the provision of a cushion 41 which forms the top surface of the handle 15 thereby to ease the impact incident to the striking movement of the operator's palm against the food chopper 10 during use. A circumferential ring 43 secures the cushion 41 to the lower support bar 38 of the handle 15.

At the lower end of the shaft 16, a bushing 45 is provided having a pair of clutch arms 47 extending laterally outwardly therefrom. The lower end of the shaft 16 is fixedly secured to the cross bar 24 by any suitable means, such as by pinning the same therein.

As viewed in FIG. 3, with each down stroke of the shaft 16 the clutch arms 47 will slide into corresponding guide slots 29, and due to the slanted posture of the guide slots 29, the shaft 16 will rotate with each downward operation thereby to turn the cross bar and the blades circumferentially during the cutting operation. The operation of the clutch assembly 21 is not deemed to be a portion of the inventive subject matter herein, and is known from prior art type devices.

With respect to the lower housing 14, it will be observed that at the approximate mid-position of the lower housing 14, an internal shoulder 49 is provided which provides a convenient nesting position for the stripper 25. Hence, the lower housing 14 conveniently carries the stripper 25 therein in a manner which permits ease of removal upon the disengagement of the bayonet fastening means 33 to disengage the upper housing 12 from the lower housing 14. As indicated previously, the lower end of the lower housing 14 is closed off by a cutting board 35 which is formed by a cutting surface 51 is bounded by peripheral skirt 53. The internal diameter across the peripheral skirt 53 is sized such as to be just slightly larger than the external diameter of the lower end of the lower housing 14 in order to permit frictional engagement of the cutting board 35 over the lower end of the lower housing 14. As indicated previously, once the upper housing 12 is removed from the lower housing 14, and the stripper 25 with the blade assembly similarly removed, the lower housing 14 with the cutting board 35 forms a container containing the food stuffs heretofore chopped therein.

With respect to FIGS. 4 and 5 of the drawings, the detailed construction of the blade assembly 20 is illustrated. It will be observed that the present invention provides a cross bar 24 which is provided with a plurality of blade slots 55 permitting the insertion of a convoluted blade 22 therein. In addition, the cross bar 24 is cored as indicated at 57, and each of the convoluted portions of the blade 22 is provided with a circular aperture 59 (FIG. 3) such that once the blade 22 is positioned with the convoluted portions of the blade 22 inserted within the blade slots 55 of the cross bar 24, the assembly may be held together by a pin 61 inserted through the core 57 and through the blade apertures 59. The pin is fixedly secured in position by any convenient means. It will therefore be appreciated that the blade assembly 20 achieves a great deal of stability and functions in a manner to insure that the blade assembly 20 will not drift during the cutting operation.

One embodiment of the subject food chopper incorporates the blade assembly 20 wherein the convoluted blade 22 is further secured to the cross bar 24 by stakes. In this embodiment stakes are provided along each side of the blade 22 where the same joins the cross bar 24, such that each portion of the convoluted blade 22 is further secured to the cross bar 24 at the point of the stakes. This feature further insures against the bending of the blade 22 and vertical stability of the blade assembly 22.

FIG. 5 also illustrates the manner in which the shaft 16 is pinned to the cross bar 24, the cross bar 24 being provided with a central aperture 63 into which the shaft is fitted and pinned from the under side of the cross bar by an appropriate pin (not shown). Hence, the blade assembly 20, including the shaft 16 fitted therein forms a very stable assembly which resists cocking, twisting or drifting during the cutting operation.

With respect to FIGS. 6 and 7 of the drawings, the construction of the stripper 25 is illustrated. It will be observed that the stripper 25 is basically cylindrical in configuration, and is closed off by a bottom wall 65. The bottom wall 65 is further provided with a convoluted slot 67 which assumes the identical configuration of the convoluted blade 22. As shown in FIG. 3 of the drawings, in its fully assembled position, the convoluted blade 22 will extend through the convoluted slot 67 with the convoluted slot 67 functioning as a stripping device for stripping food stuffs from the blade 22 during the cutting operation.

With reference to FIGS. 8 and 9 of the drawings, the construction of the cutting board 35 is illustrated. The cutting board is, once again, basically cylindrical in configuration and formed by a bottom wall or cutting surface 51 completely closing the lower portion of the cutting board 35. The upper surface of the bottom wall 51 forms a cutting surface against which the convoluted blade 22 strikes during the chopping operation. The bottom wall 51 of the cutting board 35 is bounded by a peripheral upstanding skirt 53 having an internal diameter slightly greater than the external diameter of the lower portion of the lower housing 14. Structurally, it is intended that a frictional fit be achieved between the peripherally upstanding skirt 74 and the outer wall of the lower end of the lower housing 14 such that the cutting board 35 is relatively easily removable after the cutting operation has been completed. However, the frictional engagement is intended to be sufficiently strong such that during the cutting operation, the cutting board 35 will not disengage with the lower end of the lower housing 14. It is contemplated that the necessary tolerances can be obtained during the manufacturing procedures such that a snug frictional fit is achieved with respect to these elements.

As previously indicated, the blade assembly 20 is designed and constructed to achieve maximum stability and the prevention of any cocking or drifting of the blade 22 during the cutting operation. This is achieved by securely fastening the blade 22 to the cross bar 24 in the manner previously described. It will further be appreciated from a view of FIG. 3 of the drawings that additional vertical stability is achieved by virtue of the relationship between the plunger 30 and the plunger guide 31. As illustrated therein, the plunger 30, which is coextensive with the handle 15 extends for a sufficient distance downwardly such as to be contained within the plunger guide 31 at all times. Hence, during the cutting operation, the relationship and tolerance between the outer surface of the plunger 30 and inner surface of the plunger guide 31 is such that the handle 15 is not permitted any great degree of lateral drift or cocking thereby to insure that the blade 22 will move in a perfectly vertical orientation during each chopping operation. This structural relationship further insures against any bending of the shaft 16 in the event that relatively solid food stuffs are to be chopped. It will further be appreciated that the plunger 30 remains within the plunger guide 31 throughout the complete downward movement of the handle 15 and continues to remain within the confines of the plunger guide 31 even when the handle 15 is in the fully upwardly extended posture as dictated by the urging of the coiled spring 18.

Figure 10:
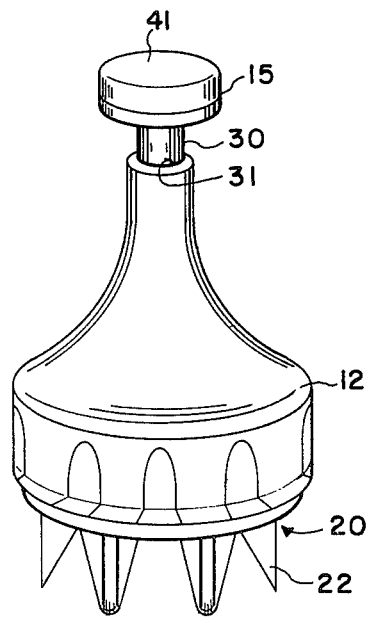
FIG. 10 is a perspective view of the upper housing with the blades, shaft and handle positioned therein.

With respect to FIG. 10 of the drawings, the structural relationship between the upper housing 12, convoluted blade 22, and handle 15 is illustrated. It is particularly noteworthy to appreciate the relationship between the plunger 30 and plunger guide 31 as illustrated in FIG. 10, since the tolerances between these two elements is quite close. As indicated previously, this results in vertical stability for the handle 15 as the same is impacted in order to force the blades into the food stuffs contained within the chamber formed by the lower housing 14 and cutting board 35. It will further be appreciated that when removing the upper housing 12 from the lower housing 14 by disengaging the bayonet fastening means 33 the blade assembly 20 is operationally movable with the upper housing 12. Hence, to disassemble the food chopper 10, the operator need only disengage the bayonet fastening means 33, and remove the upper housing 12 therefrom which will automatically carry the blade assembly therewith and remove the stripper 25 from its nesting position within the lower housing 14 thereby leaving the lower housing 14 with the cutting board 35 closing off the bottom end and the food stuffs contained therein forming a container to further process the food stuffs.

Figure 13:
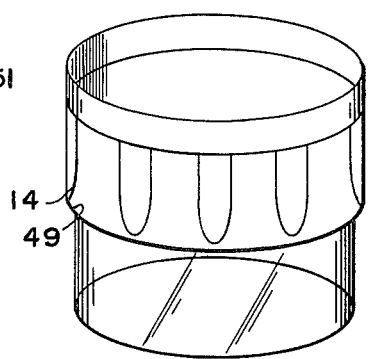
FIG. 13 is a perspective view showing the lower housing portion of the body.
Figure 11:
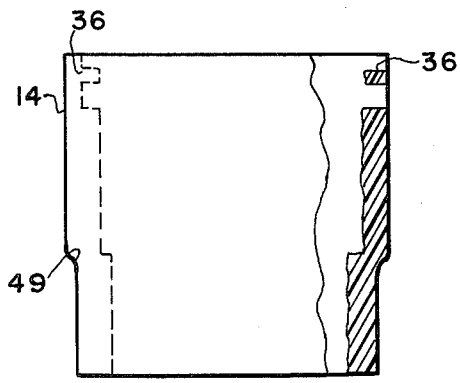
FIG. 11 is a front elevational view, partly broken away, of the lower housing illustrating the nesting shoulder for the stripper as well as a partial view of the bayonet locking feature for interlocking the upper and lower housings.

With respect to FIGS. 11 and 13 of the drawings, the structural configuration of the lower housing 14 is illustrated. As indicated previously, the lower housing 14 is provided with an internal shoulder 49 which provides the nesting point for the stripper 25. In the broken away portion of FIG. 11 the configuration of the bayonet fastening means 33 is illustrated, more particularly the construction of the bayonet flanges 36 formed as part of the internal surface of the housing 14. As indicated previously, the lock flanges 34 formed on the lower end of the upper housing 12 coact with the bayonet flanges 36 formed as part of the internal side wall of the lower housing 14 to provide a bayonet fastening means thereby to render the device easily engageable and disengageable by merely turning the upper housing 12 in one circumferential direction and the lower housing 14 in the opposed circumferential direction.

Figure 12:
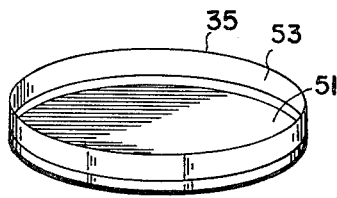
FIG. 12 is a perspective view showing the cutting board.

FIG. 12 illustrates the construction of the cutting board 35 forming one of the novel features of the present invention and, as previously indicated, is sized and dimensioned such as to form a fairly tight friction fit with the lower end of the lower housing 14.

Figure 14:
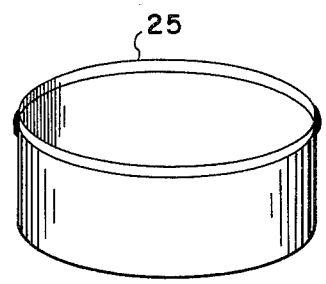
FIG. 14 is a perspective view of the stripper which nestles within the upper end of the lower housing.

FIG. 14 illustrates, once again, the structural configuration of the stripper 25 which is designed to have an external diameter slightly less than the internal diameter of the lower housing 14 such that the same is nestable within the upper portion of the lower housing 14 and designed to nest on the internal shoulder 49 formed in the lower housing 14, as more particularly illustrated in FIG. 3 of the drawings.

In the preferred embodiment of the invention, it is contemplated that the upper housing 12 is formed from an appropriate plastic material, and the plunger guide 31 is molded integrally therewith. The clutch housing 27 may be formed as a separate element and then fixedly secured to the lower end of the plunger guide 31. Any appropriate plastic material may be utilized in the manufacture, the principal requirement being stability of the plastic under vertical stress, the same being corrosion resistent and susceptable for easy washing and cleaning. Those skilled in the art may easily select from any number of known plastic materials.

The handle 15 is also a molded piece including the lower support bar 38 molded integrally with the plunger 30, the internal shoulder 39 of the plunger 30 being formed during the molding operation. Clearly, the cushion 41 is a separate element and is retained on the handle 15 by means of the circumferential ring 43.

The shaft 16 is contemplated to be formed of a metalic material, any suitable steel or aluminum being useful for the purpose intended. As indicated previously, the upper end of the shaft 16 may be frictionally fitted within the restricted portion of the plunger 30, alternatively the same may be cemented or otherwise fixedly secured in position as desired. The spring 18 which is retained between the internal shoulder 39 and the upper end of the clutch housing 27 is freely fitted in position and is sized so as to be retained within the hollow of the plunger 30 and has sufficient biasing properties such that the handle 15 is normally retained in an upwardly biased position.

The bushing 45 surrounding the lower end of the shaft 16 may be formed as a separate element and fixedly secured in position such that the clutch arms 47 are firmly retained in position at the lower end of the shaft 16 such that the same are permitted to engage the guide slots 29 with each chopping operation. As indicated previously, the guide slots 29 are purposely slanted off the vertical axis such that with each chopping operation, the blade assembly 20 is caused to move in a circumferential pathway such that the food stuffs contained within the lower portion of the food chopper 10 are thoroughly chopped.

The stripper 25 is similarly formed of an appropriate plastic material, again keeping in mind the necessary properties desirable for such products. It is contemplated that the stripper 25 should be formed of a plastic material which lends itself to easy cleaning while at the same time maintaining vertical and lateral stability under conditions of use. It is contemplated that the convoluted slot 67 formed in the bottom wall 65 of the stripper 25 is formed during the molding operation to minimize the cost of manufacture.

As to the lower housing 14 it is again contemplated that an appropriate plastic material may be utilized, and in the preferred embodiment, it is contemplated that the plastic material be transparent such that the operator may view the chopping operation and the condition of the chopped food stuffs during the chopping operation. Once again, those skilled in the art may select from any number of plastic materials which will accomplish the intended purpose.

As indicated previously, the shaft 16 is fixedly secured to the cross bar 24 by any suitable means such as pinning the same from the lower surface of the cross bar 24. One proposed construction is to have a central aperture 63 in the cross bar 24 into which the shaft 16 is fitted and the same may then be pinned from the under side of the cross bar 24. As indicated previously, the construction of the blade assembly 20 is considered to be one of the novel features of the present invention in that a highly stable blade assembly 20 has been created. The positioning of the convoluted blade 22 within the correspondingly mating blade slots 55 of the cross bar, followed by pinning the same together by means of a lateral pin 61 extending through a core 57 in the cross bar and appropriate apertures 59 in each of the convoluted portions of the blade 22 renders the complete blade assembly 20 along with the shaft 16 a very solid and integral assembly. This assembly, along with the construction and tolerances incident to the plunger 30 in relationship with the plunger guide 31 lend a high degree of vertical stability to the chopper 10 when in use since the cocking or drifting of the blades 22 during the chopping operation is minimized to the greatest extent. Another beneficial result of this construction resides in the fact that by providing the stability as indicated, the stripper 25 is preserved for a greater length of time since the blades 22 tend to ride within the convoluted slot 67 provided in the bottom wall 65 of the stripper 25. In the prior art choppers, there was an exhibited tendency of the blade to drift within the chopper during the chopping operation causing a significant amount of wear and tear with regard to the convoluted slots. It is apparent that by virtue of the present invention, in view of the stability of the blade assembly 20 as well as the relationship between the plunger 30 and plunger guide 31, that the wear and tear incident to the blade 22 rubbing the surface of the convoluted slot 67 causes a minimum of wear and tear such that the life of the stripper 25 is greatly prolonged, in effect prolonging the life of the chopper 10.

In view of the above description and drawings it is clearly apparent that the present invention provides a food chopper device which includes a self-contained cutting surface at the lower end of the chopper body permitting the chopper itself to be utilized on any any underlying support surface whether the same is flat or corrugated. In addition, the provision of a self-contained cutting surface at the lower end thereof, in combination with the ease of removal of the upper housing from the lower housing permits the lower housing in conjunction with the lower cutting surface to be utilized as a container such that foods once chopped therein, may be easily further processed without the need of any additional utensils and the like. Furthermore, the provision of an improved blade assembly wherein the convoluted blade is firmly held in a slotted cross bar and totally pinned in position provides a highly stable blade assembly which minimizes the tendency of the blade assembly to drift or cock during the chopping operation. Furthermore, the provision of a plunger which is at least partially contained within a plunger guide, with these elements having relatively close tolerances further adds to the vertical stability of the chopper, more specifically, the vertical stability of the blade assembly when utilized in a chopping operation. Finally, it will be appreciated that the present invention provides a chopper which is more convenient and easier to use since the handle portion of the chopper is provided with a cushion thereby to lessen the impact as against the palm of the operator during the chopping operation.

It is therefore appreciated that all of the above objects and advantages, as well as additional objects and advantages have been accomplished and provided by means of the food chopper depicted herein, and the various embodiments thereof to provide an easily assemblable and disassemblable chopper for ease of cleaning and repairing and more efficient in operation.

While there has been described what is at present considered to be the preferred embodiment of the invention, it will be understood that various modifications may be made therein and it is intended to cover the appended claims all such modifications as fall within the true spirit and scope of this invention.

What is claimed is:

1. A food chopper and cutting surface comprising,
a body having an upper and lower housing,
said lower housing having a lower portion thereof,
a cutting board conforming to the lower housing configuration,
means for removably securing the cutting board to the lower portion of the lower surface,
a handle and shaft yieldably secured to the upper housing for riciprocation,
a cross bar secured to the lower portion of the shaft and having a plurality of slots along the bottom thereof and extending only partially upwardly into said cross bar,
pin means passing through the cross bar and slots, an integral convoluted blade being uninterrupted excepting only for having holes to receive said pin means, and
a stripper in said lower housing having slots conforming to the convolutions of the blade.

2. The food chopper of claim 1 having,
a cushion on said handle to soften the impact on the hand.

3. The food chopper of claim 1 having,
a bayonet fastener means between the upper and lower housing whereby the lower housing and cutting board may be removed to empty the contents after chopping.

4. The food chopper of claim 1 having,
a plunger depending from said handle,
a plunger guide proportioned to receive the plunger in the upper portion of the upper housing,
whereby said plunger guide functions to guide said plunger as the blade is urged downwardly by the downward movement of said plunger.

5. The food chopper of claim 1 wherein said cutting board includes a cutting surface bounded by an upstanding peripheral rim, said upstanding peripheral rim having an internal diameter slightly greater than the external diameter of the lower housing whereby said cutting board is frictionally engageable with the lower end of the lower housing.

6. The food chopper of claim 1 wherein said pin means comprises a cylindrical pin appropriately sized to pass through said cross bar, said slots in said cross bar, and said holes in said convoluted blade.

* * * * *